United States Patent Office 3,577,385
Patented May 4, 1971

3,577,385
POLYURETHANE ELASTOMERS PREPARED BY REACTING A MIXTURE OF A POLYOXYALKYLENE ETHER DIOL OF A DIHYDRIC PHENOL AND A POLYOXYALKYLENE ETHER OF A POLYOL WITH AN ORGANIC POLYISOCYANATE
Joseph Feltzin and Nadji Y. Tehrani, Wilmington, Del., assignors to Atlas Chemical Industries, Inc., Wilmington, Del.
No Drawing. Filed May 15, 1967, Ser. No. 638,630
Int. Cl. C08g 22/26
U.S. Cl. 260—47                                  8 Claims

ABSTRACT OF THE DISCLOSURE

Polyurethanes having improved properties are prepared by reacting polyoxyalkylene ether diols containing a carboxycyclic or oxacyclic ring and from 2 to 10 oxyalkylene groups, polyoxyalkylene ether polyols containing from 5 to 10 hydroxyl groups and from 15 to 90 oxyalkylene groups, and organic polyisocyanates.

---

This invention relates to polyethers and to polyurethanes prepared with polyethers. More particularly, this invention relates to blends of hydroxyl containing polyethers and to polyether-polyurethanes which have improved properties. Still more particularly, this invention relates to elastomeric polyether polyurethanes which have improved physical properties and which are prepared with certain combinations of polyethers.

Polyurethane elastomers prepared by reacting organic polyisocyanates with various polyhydroxyl compounds according to the "prepolymer" and "one-shot" techniques are well known in the prior art. The polyurethane elastomers known heretofore have, however, left much to be desired in the areas of pot-life and physical properties such as compression set, compressive strength, abrasion resistance, tear strength, and tensile strength. Furthermore, the preparation of polyurethane elastomers known heretofore require high temperatures and long reaction times.

It is, accordingly, an object of this invention to provide polyurethanes which have improved properties.

It is another object of this invention to provide polyurethane elastomers which have improved physical properties.

It is another object of this invention to provide polyurethanes which have high load bearing properties.

It is another object of this invention to provide elastomeric polyurethanes which have high tensile strength, high compressive strength, high tear strength, and low compression set.

It is another object of this invention to provide polyurethanes which have long pot life.

It is another object of this invention to provide novel blends of hydroxyl containing polyethers.

It is another object of this invention to provide polyurethanes which may be prepared at room temperature.

The foregoing objects and still further objects are broadly accomplished according to the present invention by providing polyurethanes prepared by reacting (I) a polyoxyalkylene ether of a diol, wherein the diol is selected from the group consisting of diols containing a carbocyclic ring structure and diols containing an oxacyclic ring structure and wherein the number of mols of oxyalkylene groups per mol of ether is from 2 to 10;
(II) a polyoxyalkylene ether of a polyol, wherein the polyol contains from 5 to 10 hydroxyl groups and wherein the number of mols of oxyalkylene groups per mol of ether is from 15 to 90; and
(III) an organic polyisocyanate.

The polyoxyalkylene ethers of diols which may be used to prepare the polyurethanes of this invention are known, and they may be prepared in any suitable manner conventional in the prior art. For example, the polyoxyalkylene ether diols may be prepared by condensing one molar proportion of a diol having a carbocyclic or oxacyclic ring structure with from 2 to 10 molar proportions of an alkylene oxide. Illustrative examples of alkylene oxides which may be used are ethylene oxide, propylene oxide, butylene oxide, and pentylene oxide. The preferred alkylene oxide is propylene oxide. Illustrative examples of diols containing an oxacyclic ring structure which may be used are the isohexides such as isosorbide and isomannide, isodulcide, furan dicarbinol, dioxane dicarbinol, tetrahydrofuran dicarbinol, tetrahydropyran dimethanol, and pyran dicarbinol. The preferred diol containing an oxacyclic ring structure is isosorbide. Illustrative examples of diols containing a carbocyclic ring structure which may be used are 2,2′-bis(4-hydroxyphenyl) propane, 2,2′-bis(4-hydroxyphenyl) butane, bis(4-hydroxyphenyl) methane, 2,2′-bis(3-methyl-4-hydroxyphenyl) propane, resorcinol, hydroquinone, catechol, p,p′-dihydroxybiphenyl, cyclohexane dimethanol, cyclopentane dicarbinol, fluorene dicarbinol, 2,4-dihydroxy benzophenone, 4,4′-dihydroxydiphenyl ether, 4,4′-dihydroxydiphenyl sulfone, 4,4′-dihydroxydiphenyl ketone, and p-xylene dicarbinol. The preferred diol containing a carbocyclic ring structure is 2,2′-bis(4-hydroxyphenyl) propane.

A preferred class of polyoxyalkylene ether diols useful in this invention are those having the general formula:

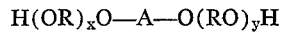

wherein $x$ and $y$ are integers and the sum of $x$ and $y$ is from 2 to 10, R is an alkylene group having from 2 to 4 carbon atoms, and A is a hydroxyl-free radical of a diol selected from the group consisting of diols containing a carbocyclic ring structure and isohexides.

Within the above preferred class of polyoxyalkylene ether diols useful in this invention, there may be mentioned those compounds having the formula:

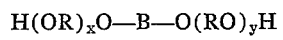

wherein $x$ and $y$ are integers and the sum of $x$ and $y$ is from 2 to 10, R is an alkylene group having from 2 to 4 carbon atoms, and B is a hydroxyl-free radical of dihydric phenol having two benzene rings joined by an alkylene group having from 1 to 4 carbon atoms.

A still more preferred class of polyoxyalkylene ether diols useful in this invention are those having the formula:

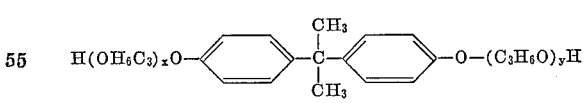

wherein $x$ and $y$ are integers and the sum of $x$ and $y$ is from 2 to 5. The preferred polyoxyalkylene ether diol is polyoxypropylene (3) 2,2-bis(4-hydroxyphenyl) propane.

The polyoxyalkylene ethers of polyols which may be used to prepare the polyurethanes of this invention are known, and they may be prepared in any suitable manner conventional in the prior art. For example, the polyoxyalkylene ether polyols may be prepared by condensing one molar proportion of a polyol having from 5 to 10 hydroxyl groups with from 15 to 90 molar proportions of alkylene oxide. Illustrative examples of polyols which may be used are arabitol, xylitol, quercitol, sorbitol, mannitol, inositol, dulcitol, glucose, mannose, galactose, talose, allose, altrose, idose, fructose, sorbose, glucofuranose, glycopyranose, sorbofuranose, sorbitol diether, sucrose, lactose, maltose, cellobiose, lactositol, and tetrapentaerythritol. The preferred polyol is sorbitol. Illustrative examples of alkylene oxides which may be used are ethylene oxide, propylene oxide, butylene oxide, and pentylene oxide. The preferred alkylene oxide is propylene oxide.

A preferred class of polyoxyalkylene ether polyols which may be used to prepare the polyurethanes of this invention are those having the general formula:

wherein $m$ is at least 2, $n$ is from 5 to 10, and the product of $m$ and $n$ is from 15 to 90; R is an alkylene group having from 2 to 4 carbon atoms; and D is a hydroxyl-free radical of a polyol containing from 5 to 10 hydroxyl groups.

Within the above preferred class of polyoxyalkylene ether polyols useful in this invention, there are those compounds having the general formula:

wherein $m$ is at least 2, $n$ is from 6 to 8, and the product of $m$ and $n$ is from 15 to 90; R is an alkylene group having from 2 to 4 carbon atoms; and E is a hydroxyl-free radical of a polyol containing from 6 to 8 hydroxyl groups.

A still more preferred class of polyoxyalkylene ether polyols useful in this invention are the polyoxypropylene ethers of sorbitol wherein the number of mols of oxypropylene groups per mol is from 25 to 75.

Any of a wide variety of organic polyisocyanates may be used in the preparation of the polyurethanes of this invention, including aromatic, aliphatic, and cycloaliphatic polyisocyanates. Representative polyisocyanates include diphenylmethane diisocyanate, Isonate 143L diisocyanate (a liquid diisocyanate structurally similar to diphenylmethane diisocyanate, available from the Upjohn Company), the tolylene diisocyanates, hexamethylene diisocyanate, 4-methoxy-m-phenylene diisocyanate, 1,5-napththylene diisocyanate, 1,4-cyclohexylene diisocyanate, p-phenylene diisocyanate, xylene diisocyanate, toluene triisocyanate, trimethylene diisocyanate, and diphenyl ether triisocyanate. Arylene diisocyanates, that is, those in which each of the two isocyanate groups is attached directly to an aromatic ring, are preferred. The preferred organic polyisocyanate is diphenylmethane diisocyanate.

The relative amounts of polyoxyalkylene ether diol, polyoxyalkylene ether polyol, and organic polyisocyanate which are used to prepare the polyurethanes of this invention may vary over a broad range, and the particular amounts chosen will depend, largely, on the intended use of the polyurethanes. In general, satisfactory results may be obtained where the reactants are used in an amount such that the overall ratio of isocyanate groups to hydroxyl groups is from 0.8 to 1.2 and preferably about 1, and the ratio of hydroxyl groups available from the polyoxyalkylene ether diol to hydroxyl groups available from the polyoxyalkylene ether polyol is from 0.3 to 3 and preferably from 0.6 to 1.5. The most preferred ratio of hydroxyl groups available from the polyoxyalkylene ether diol to hydroxyl group available from the polyoxyalkylene ether polyol is 1.

The polyurethanes of this invention may be prepared by reacting an organic polyisocyanate with both a polyoxyalkylene ether diol of the above-defined type and a polyoxyalkylene ether polyol of the above-defined type. The reaction may be carried out according to the so-called "one-shot" method or the "prepolymer" method. However, regardless of the particular method selected for the preparation of the polyurethanes of this invention, it is essential that both polyoxyalkylene ether diol and polyoxyalkylene ether polyol are used.

The one-shot method comprises reacting the organic polyisocyanate with a mixture of polyoxyalkylene ether diol and polyoxyalkylene ether polyol. By this method, all the polyisocyanate, polyoxyalkylene ether diol, and polyoxyalkylene ether polyol are reacted in a single step.

Broadly, the prepolymer method comprises sequentially reacting the organic polyisocyanate, polyoxyalkylene ether diol, and polyoxyalkylene ether polyol. Thus, the polyurethanes may be prepared sequentially by first preparing an isocyanate terminated prepolymer by reacting at least one compound selected from the group consisting of polyoxyalkylene ether diol and polyoxyalkylene ether polyol with a stoichiometric excess of at least one organic polyisocyanate, and then in a second step reacting the prepolymer with at least one compound selected from the group consisting of polyoxyalkylene ether diol and polyoxyalkylene ether polyol, provided, of course, that at least one of the compounds employed is a polyoxyalkylene ether diol and that at least one of the compounds employed is a polyoxyalkylene ether polyol. The polyurethanes may also be prepared by first preparing a hydroxyl terminated prepolymer by reacting an organic polyisocyanate with a stoichiometric excess of a mixture of polyoxyalkylene ether diol and polyoxyalkylene ether polyol, and then in a second step reacting the prepolymer with additional organic polyisocyanate. The polyurethanes may also be prepared by first reacting an organic polyisocyanate with polyoxyalkylene ether diol or polyoxyalkylene ether polyol to form either a hydroxyl terminated propolymer or an isocyanate terminated prepolymer, depending upon the amount of organic polyisocyanate employed, and then is a second step reacting the prepolymer with additional organic polyisocyanate and polyoxyalkylene ether diol or polyoxyalkylene ether polyol.

The above described methods of preparing the polyurethanes of this invention may be carried out at any temperature normally used in the prior art for the preparation of polyurethanes. In addition, it has been found that with the novel combinations of hydroxyl compounds disclosed herein, it is possible to readily prepare polyurethanes at lower reaction temperatures than are normally used. In fact, the only requirement as to temperature is that the reaction be conducted at a temperature where the reactants are in liquid form. For example, when an organic polyisocyanate which is liquid at room temperature is used, such as tolylene diisocyanate, urethane formation occurs rapidly at room temperatures. The preferred reaction temperature is from 25° C. to 90° C.

It has also been discovered that the pot-life of the polyurethanes of this invention are dependent upon the temperature used for the preparation of the polyurethane. The lower the temperature at which the reaction is carried out, the longer is the pot-life of the resulting polyurethanes. Thus, when a polyurethane having a long pot-life is desired, the reaction is conducted at as low a temperature as is possible and still maintain the reactants in liquid form. Polyurethanes having a pot-life of 75 hours have been prepared by the process of this invention.

After the polyoxyalkylene ether diol, polyoxyalkylene ether polyol, and organic polyisocyanate have been reacted in the manner described above, the resulting polyurethane may be poured into a mold and cured. The cure time of the polyurethane may be decreased by the application of heat and/or the addition of catalyst. In general, cure time will decrease as the temperature is increased. For example, the polyurethanes may be cured by heating for 16 hours at 40° C. to 45° C. or by heating for 3 hours at 100° C.

The catalysts used to accelerate the cure of the polyurethanes of this invention may be any of the catalysts presently used in the art to accelerate the cure of polyurethanes. Among the numerous catalysts which may be used are tetramethylethylenediamine, tetramethyl guanidine, tetramethyl-1,3-butanediamine, trimethylene diamine, dimethylethanolamine, stannous oleate, stannous octoate, dibutyl tin diacetate, dibutyl tin dilaurate, and Carstan-TGBM (available from the Carlisle Chemical Works).

The invention will be more readily understood from a consideration of the following examples which are presented for illustrative purposes and are not to be construed as limiting the invention.

The following procedure is employed in Examples 1 to 8. The reactants are degassed and dehumidified in a vacuum oven at 105–115° C. for two hours. The prepolymer hydroxy compound is cooled under vacuum to 50° C. Solid diphenylmethane diisocyanate is heated to 80° C. and added gradually (one minute) to the cooled prepolymer hydroxy compound. The resulting prepolymer is stirred until homogenous (two minutes) and then cooled by means of an ice bath to 35–45° C. The chain extender is cooled to 25° C. and added to the prepolymer. The reaction temperature is maintained at 55–60° C. for 2 to 3 minutes. The resulting product is stirred for two minutes making sure that no air bubbles are trapped in the product and then degassed at room temperature and under 30 inches of vacuum until air bubbles cease to evolve. The degassed product is poured into a mold and heated at 100° C., for 3 hours.

The following procedure is employed in Examples 9 and 10. The hydroxy compounds used are degassed and dehumidified in a vacuum oven at 105–110° C. for two hours. The hydroxy compound used to prepare the prepolymer is cooled under vacuum to 25° C. Tolylene diisocyanate (TDI) at 25° C. is added to the hydroxyl compound and the resulting mixture stirred until homogenous (2–4 minutes) to form a prepolymer. The chain extender is cooled to 25° C., mixed with 100 mg. of stannous octoate, and added to the prepolymer. The resulting product is stirred until homogenous. The product is then degassed at room temperature under vacuum, poured into a mold, and cured at 100° C. for three hours.

| Example Number | Prepolymer hydroxy compound | Grams of prepolymer hydroxy compound | Grams of TDI | Chain extender | Grams of chain extender |
|---|---|---|---|---|---|
| 9 | 50 P. sorbitol | 171.2 | 69.6 | 3 P. BPA | 80.8 |
| 10 | 30 P. sorbitol | 120.0 | 69.6 | 3 P. BPA | 80.8 |

The following procedure is employed in Examples 11 to 18. The polyoxyalkylene ether diol (I) and polyoxyalkylene ether polyol (II) are mixed together at room temperature and degassed and dehumidified in a vacuum oven at 105–110° C. for two hours. The mixture of hydroxy compounds are cooled to 50° C. Solid diphenyl methane diisocyanate is heated to 80° C., and added gradually (one minute) to the mixture of hydroxy compounds. The resulting polyurethane is stirred until homogenous (two minutes), cooled to 35–45° C., degassed under 30 inches of vacuum at room temperature until air bubbles cease to evolve, poured into a mold, and cured at 100° C. for three hours.

| | Prepolymer hydroxy compound | Grams of prepolymer hydroxy compound | Grams of diisocyanate | Chain extender | Grams of chain extender |
|---|---|---|---|---|---|
| Example Number: | | | | | |
| 1 | 3 P. BPA [1] | 80.8 | 100 | 50 P. sorbitol [2] | 171.2 |
| 2 | 3 D. BPA [3] | 72 | 100 | 30 P. sorbitol [4] | 120 |
| 3 | 50 P. sorbitol plus 3 P. BPA | 57.1 / 26.9 | 100 | 50 P. sorbitol plus 3 P. BPA | 114.1 / 53.9 |
| 4 | 50 P. sorbitol plus 3 P. BPA | 85.6 / 40.4 | 100 | 50 P. sorbitol plus 3 P. BPA | 85.6 / 40.4 |
| 5 | 50 P. sorbitol plus 3 P. BPA | 113 / 53.3 | 100 | 50 P. sorbitol plus 3 P. BPA | 58.2 / 27.5 |
| 6 | 30 P. sorbitol | 120 | 100 | 3 P. BPA | 80.8 |
| 7 | 50 P. sorbitol | 171.2 | 100 | 3 P. BPA | 80.8 |
| 8 | 70 P. sorbitol [5] | 154.5 | 75 | 3 P. BPA | 60.6 |

[1] Polyoxypropylene (3) bisphenol A.
[2] Polyoxypropylene (50) sorbitol.
[3] Polyoxyethylene (3) bisphenol A.
[4] Polyoxypropylene (30) sorbitol.
[5] Polyoxypropylene (70) sorbitol.

| | Polyoxyalkylene ether diol | Grams of polyoxyalkylene ether diol | Polyoxyalkylene ether polyol | Grams of polyoxyalkylene ether polyol | Grams of diisocyanate |
|---|---|---|---|---|---|
| Example Number: | | | | | |
| 11 | 3 P. BPA | 60.6 | 70 P. sorbitol | 154.5 | 75 |
| 12 | 3 P. BPA | 80.8 | 30 P. sorbitol | 120 | 100 |
| 13 | 3 P. BPA | 80.8 | 50 P. sorbitol | 171.2 | 100 |
| 14 | 4 P. Isosorbide [1] | 76.4 | 30 P. sorbitol | 120 | 100 |
| 15 | 2 P. CHD [2] | 54.4 | 50 P. sorbitol | 171.2 | 100 |
| 16 | 3 P. BPA | 80.8 | 50 P. lactositol [3] | 160.4 | 100 |
| 17 | 3 P. Hyd. BPA [4] | 84.0 | 50 P. sorbitol | 171.2 | 100 |
| 18 | 3 P. BPA | 80.8 | 50 P. sucrose [5] | 111.6 | 100 |

[1] Polyoxypropylene (4) isosorbide.
[2] Polyoxypropylene (2) cyclohexane dimethanol.
[3] Polyoxypropylene (50) lactositol.
[4] Polyoxypropylene (3) hydrogenated 2,2-bis (4-hydroxyphenyl) propane.
[5] Polyoxypropylene (50) sucrose.

The polyurethanes of the foregoing illustrative examples had the following properties.

| Example Number | Modulus[1] 100%, p.s.i. | Tensile,[2] p.s.i. | Compressive[3] strength, p.s.i. | Compression[4] set-method B, percent | Graves[5] tear die (C) pli | Shore[6] hardness | Dielectric[7] strength volume/mil. |
|---|---|---|---|---|---|---|---|
| 1  | 1,830 | 2,260 | 4,720  |     | 479   | 87A | >480   |
| 2  |       | 8,400 | 11,000 |     | 1,302 | 80D |        |
| 3  | 2,182 | 3,432 | 6,100  | 5   | 731   | 53D | >561   |
| 4  | 2,381 | 3,646 | 5,675  | 3   | 775   | 57D | >602   |
| 5  | 1,347 | 3,260 | 4,750  | 3   | 616   | 43D | >581   |
| 6  |       | 7,424 | 12,000 | 13  | 786   | 77D | >820   |
| 7  | 2,628 | 4,196 | 6,500  | 5   | 750   | 49D | 467    |
| 8  | 1,113 | 3,367 | 532    | 2.5 | 215   | 25D | 719    |
| 9  | 1,446 | 2,912 | 1,750  | 0   | 305   | 33D | 655    |
| 10 |       | 7,088 | 11,625 |     |       | 82D | >1,042 |
| 11 | 1,155 | 3,238 | 590    | 0   | 298   | 22D | >568   |
| 12 |       | 7,766 | 12,250 | 20  | 971   | 80D | >685   |
| 13 | 2,728 | 3,794 | 7,000  | 4   | 1,027 | 67D | >617   |
| 14 | 2,600 | 3,140 | 10,312 | 11  | 110   | 75D | 803    |
| 15 | 1,028 | 2,120 | 1,040  | 0   | 134   | 24D | >768   |
| 16 |       | 3,264 | 9,590  | 11  | 1,282 | 78D | 600    |
| 17 | 1,660 | 2,566 | 4,900  | 3   | 474   | 46D | >649   |
| 18 |       | 5,421 | 12,000 | 8   | 1,255 | 82D | >549   |

[1] ASTM D-412-61T.
[2] ASTM D-412-61T.
[3] ASTM D-575-46.
[4] ASTM D-395-61.
[5] ASTM D-624-54.
[6] ASTM D-676-59T.
[7] ASTM D-149.

The polyurethanes prepared according to this invention have many varied uses. They may be employed in the preparation of shoe heels, gaskets, belts, potting and encapsulating of electrical components, printing rollers, cable jackets, footwear, shock absorbers, vibration mounts, tires, pipe sealants, O-rings, oil seals, airplane wing tanks, bearings, auto parts, and rocket propellant binders.

The elastomeric properties of these polyurethanes may be varied by suitable compounding. The amount and type of compounding agent to be incorporated is dependent upon the use for which the polyurethane is intended. The compounding agents ordinarily used in the rubber industry with either natural or synthetic rubber are useful with the products of this invention. These include carbon black, clay, silica, talc, zinc and magnesium oxides, calcium and magnesium carbonates, titanium dioxide, plasticizers, and surfactants. Inorganic and organic coloring agents may be incorporated to give well-defined colors, as the natural color of these polyurethane elastomers is a pale yellow or light amber.

Although this invention has been described with reference to particular embodiments and examples, it will be apparent to those skilled in the art that variations and modifications thereof can be made without departing from the principles and true spirit of the invention.

Having described the invention, what is desired to be protected by Letters Patent is:

1. A polyurethane elastomer prepared by reacting
   (I) a polyoxyalkylene ether of a diol having the formula $H(OR)_xOBO(RO)_yH$ wherein $x$ and $y$ are integers and the sum of $x$ and $y$ is from 2 to 10, R is an alkylene group having from 2 to 4 carbon atoms, and B is a hydroxyl-free radical of a dihydric phenol having two benzene rings joined by an alkylene group having from 1 to 4 carbon atoms;
   (II) a polyoxyalkylene ether of a polyol having the formula $E[O(RO)_mH]_n$ wherein $m$ is at least 2, $n$ is from 6 to 8, the product of $m$ and $n$ is from 15 to 90, R is an alkylene group having from 2 to 4 carbon atoms, and E is a hydroxyl-free radical of a polyol containing from 6 to 8 hydroxyl groups; and
   (III) an organic polyisocyanate; wherein the polyoxyalkylene ether of a diol, the polyoxyalkylene ether of a polyol, and the organic polyisocyanate are used in proportions such that the ratio of NCO groups to hydroxyl groups is from 0.8 to 1.2 and the ratio of hydroxyl groups available from said polyoxyalkylene ether of a diol to hydroxyl groups available from said polyoxyalkylene ether of a polyol is from 0.3 to 3.

2. A polyurethane elastomer according to claim 1 prepared sequentially by first preparing an isocyanate terminated prepolymer by reacting at least one compound selected from the group consisting of polyoxyalkylene ether of a diol (I) and polyoxyalkylene ether of a polyol (II) with a stoichiometric excess of at least one organic polyisocyanate (III), and then in a second step reacting the prepolymer with at least one compound selected from the group consisting of polyoxyalkylene ether of a diol (I) and polyoxyalkylene ether of a polyol (II), provided that at least one of the compounds employed is a polyoxyalkylene ether of a diol (I) and that at least one of the compounds employed is a polyoxyalkylene ether of a polyol (II).

3. A polyurethane elastomer according to claim 1 wherein the polyoxyalkylene ether of a diol, the polyoxyalkylene ether of a polyol, and the organic polyisocyanate are used in proportions such that the ratio of NCO groups to hydroxyl groups is about one and the ratio of hydroxyl groups available from the polyoxyalkylene ether of a diol to hydroxyl groups available from the polyoxyalkylene ether of a polyol is about 1.

4. A polyurethane elastomer according to claim 3 wherein the polyoxyalkylene ether of a diol has the formula

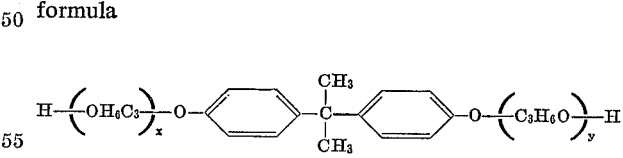

wherein $x$ and $y$ are integers and the sum of $x$ and $y$ is from 2 to 5, and the polyoxyalkylene ether of a polyol is a polyoxypropylene ether of sorbitol wherein the number of mols of oxypropylene groups per mol of ether is from 25 to 75.

5. A polyurethane elastomer according to claim 4 wherein the organic polyisocyanate is a diisocyanate having the isocyanate groups attached directly to an aromatic ring.

6. A polyurethane elastomer according to claim 2 where the polyoxyalkylene ether of a diol, the polyoxyalkylene ether of a polyol, and the organic polyisocyanate are used in proportions such that the ratio of NCO groups to hydroxyl groups is about one and the ratio of hydroxyl groups available from the polyoxyalkylene ether of a diol to hydroxyl groups available from the polyoxyalkylene ether of a polyol is about one.

7. A polyurethane elastomer according to claim 6 where the polyoxyalkylene ether of a diol has the formula

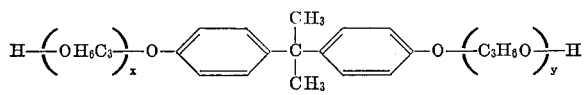

wherein $x$ and $y$ are integers and the sum of $x$ and $y$ is from 2 to 5, and the polyoxyalkylene ether of a polyol is a polyoxypropylene ether of sorbitol wherein the number of mols of oxypropylene groups per mol of ether is from 25 to 75.

8. A polyurethane elastomer according to claim 7 where the organic polyisocyanate is a diisocyanate having the isocyanate groups attached directly to an aromatic ring.

References Cited

UNITED STATES PATENTS 3,436,361   4/1969   Wooster _____ 260—18

WILLIAM H. SHORT, Primary Examiner

L. L. LEE, Assistant Examiner

U.S. Cl. X.R.

260—37, 775

PO-1050
(5/69)

UNITED STATES PATENT OFFICE
CERTIFICATE OF CORRECTION

Patent No. 3,577,387     Dated May 4, 1971

Inventor(s) Hilde Kersten et al

It is certified that error appears in the above-identified patent and that said Letters Patent are hereby corrected as shown below:

Column 1, line 43, that portion of the formula reading "O=O" should read -- O=C --.

Column 3, line 58, "intra-red" should read -- infra-red --.

Column 7, line 9, formula VIII, that portion of the formula reading "N" should read -- NH --.

Signed and sealed this 10th day of August 1971.

(SEAL)
Attest:

EDWARD M. FLETCHER, JR.            WILLIAM E. SCHUYLER, JR.
Attesting Officer                   Commissioner of Patents